UNITED STATES PATENT OFFICE.

JOHN FULTS, OF WASHINGTON COURT-HOUSE, OHIO.

MANUFACTURE OF POTTERY-WARE AND MORTAR.

SPECIFICATION forming part of Letters Patent No. 224,895, dated February 24, 1880.

Application filed December 8, 1879.

*To all whom it may concern:*

Be it known that I, JOHN FULTS, of Washington Court-House, in the county of Fayette and State of Ohio, have invented certain new and useful Improvements in the Manufacture of Pottery-Ware and Mortar; and I do hereby declare the following to be a full, clear, and exact description of the invention, such as will enable others skilled in the art to which it pertains to make and use it, reference being had to the accompanying drawings, which form part of this specification.

My invention relates to an improvement in the manufacture of pottery-ware and mortar; and it consists in mixing with the clay or mortar while it is in a condition to be worked a compound composed of salt and lard, for the purpose of preventing it from freezing during cold weather, as will be more fully described hereinafter.

This compound consists of twenty parts of salt and one part of lard. These two ingredients are mixed together. After these two ingredients have been mixed together, from two to three pounds of it are mixed with every one hundred pounds of clay or mortar.

This compound serves not only to prevent the clay or mortar from freezing during cold weather, but to toughen the clay while being burned, so that it will not crumble and crack.

I am aware of the use of salt in the manufacture of fire-brick, and this I disclaim. The use of salt alone prevents freezing of the clay; but while the clay containing salt is being burned the clay crumbles and becomes useless. The addition of the lard counteracts all tendency to crumble and keeps the clay as homogeneous as in its natural condition.

Having thus described my invention, I claim—

As an improvement in the manufacture of pottery-ware, the mixture of salt and lard, in about the proportions specified, with the clay or mortar for the purpose of preventing the clay or mortar from freezing, substantially as described.

In testimony that I claim the foregoing I have hereunto set my hand and seal this 5th day of December, 1879.

JOHN FULTS. [L. S.]

Witnesses:
C. J. BELL,
J. P. ROBINSON.